US009885411B2

(12) United States Patent
Peter et al.

(10) Patent No.: US 9,885,411 B2
(45) Date of Patent: Feb. 6, 2018

(54) DRIVE SPINDLE AND SPINDLE DRIVE AND METHOD FOR PRODUCING A DRIVE SPINDLE

(71) Applicant: Robert Bosch GmbH, Stuttgart (DE)

(72) Inventors: Gilles Peter, Morsbronn les Bains (FR); Christof Angerer, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 14/397,233

(22) PCT Filed: Mar. 4, 2013

(86) PCT No.: PCT/EP2013/054283
§ 371 (c)(1),
(2) Date: Oct. 27, 2014

(87) PCT Pub. No.: WO2013/159968
PCT Pub. Date: Oct. 31, 2013

(65) Prior Publication Data
US 2015/0323054 A1    Nov. 12, 2015

(30) Foreign Application Priority Data

Apr. 27, 2012 (DE) .......................... 10 2012 207 129

(51) Int. Cl.
| F16H 1/16 | (2006.01) |
| F16H 57/00 | (2012.01) |
| F16H 57/021 | (2012.01) |
| F16H 57/039 | (2012.01) |
| F16H 25/20 | (2006.01) |

(Continued)

(52) U.S. Cl.
CPC ......... *F16H 57/0025* (2013.01); *B60N 2/067* (2013.01); *B60N 2/443* (2013.01);
(Continued)

(58) Field of Classification Search
CPC .... F16H 57/0025; F16H 25/20; F16H 57/021; F16H 57/039; B60N 2/067; B60N 2/443
See application file for complete search history.

(56) References Cited

U.S. PATENT DOCUMENTS

| 5,778,733 A | * | 7/1998 | Stringer | ................. | B60N 2/443 |
| | | | | | 297/362.14 |
| 7,467,565 B2 | * | 12/2008 | Oberle | .................... | F16C 17/08 |
| | | | | | 74/409 |

(Continued)

FOREIGN PATENT DOCUMENTS

| CN | 1621266 A | 6/2005 |
| CN | 101846154 A | 9/2010 |

(Continued)

OTHER PUBLICATIONS

International Search Report for Application No. PCT/EP2013/054283 dated May 6, 2013 (English Translation, 2 pages).

*Primary Examiner* — Zakaria Elahmadi
(74) *Attorney, Agent, or Firm* — Michael Best & Friedrich LLP

(57) ABSTRACT

A spindle drive (1), drive spindle (8), and a production method for such a spindle, particularly for a seat adjustment or a servo steering mechanism, having a spindle thread (19) for receiving a spindle nut (9), wherein a drive gear (5) made from synthetic material is injection-molded in a non-rotatable manner on the drive spindle (8), said cog having external toothing (21), by means of which the drive spindle (8) can be caused to rotate, wherein within an axial extension (27) of the drive cog (5) the threaded spindle (8) has a recessed region (31) with a smaller external diameter (30) between two holding regions (28, 38) with a larger outer diameter (29, 39).

21 Claims, 4 Drawing Sheets

(51) Int. Cl.
    *B60N 2/06*     (2006.01)
    *B60N 2/44*     (2006.01)
    *F16H 57/02*     (2012.01)
    *F16H 55/22*     (2006.01)
    *F16H 55/06*     (2006.01)
    *F16H 25/24*     (2006.01)

(52) U.S. Cl.
    CPC ........... *F16H 25/20* (2013.01); *F16H 57/021* (2013.01); *F16H 57/039* (2013.01); *F16H 55/22* (2013.01); *F16H 2025/209* (2013.01); *F16H 2025/2481* (2013.01); *F16H 2055/065* (2013.01); *F16H 2057/02034* (2013.01); *F16H 2057/02082* (2013.01); *Y10T 29/49467* (2015.01); *Y10T 74/1987* (2015.01)

(56) References Cited

U.S. PATENT DOCUMENTS

| | | | | |
|---|---|---|---|---|
| 2002/0073790 | A1* | 6/2002 | Wiesler | B60N 2/0224 74/89.34 |
| 2008/0011114 | A1* | 1/2008 | Oberle | B60N 2/067 74/89.23 |
| 2008/0163712 | A1* | 7/2008 | Oberle | F16H 57/021 74/424 |
| 2008/0196965 | A1* | 8/2008 | Oberle | B60N 2/0224 180/384 |
| 2008/0295624 | A1* | 12/2008 | Oberle | B60N 2/067 74/89.34 |
| 2009/0206644 | A1 | 8/2009 | Ishii et al. | |
| 2011/0000328 | A1* | 1/2011 | Oberle | B60N 2/0232 74/89.23 |
| 2011/0303032 | A1* | 12/2011 | Oberle | B60N 2/443 74/89.39 |
| 2012/0118089 | A1* | 5/2012 | Angerer | B60N 2/067 74/89.23 |

FOREIGN PATENT DOCUMENTS

| | | |
|---|---|---|
| DE | 102005046356 | 3/2007 |
| EP | 0759374 | 2/1997 |
| EP | 1223073 | 7/2002 |
| WO | 2004020870 | 3/2004 |
| WO | 2004040870 A1 | 5/2004 |

\* cited by examiner

DRIVE SPINDLE AND SPINDLE DRIVE AND METHOD FOR PRODUCING A DRIVE SPINDLE

BACKGROUND OF THE INVENTION

The present invention relates to a gear spindle, a spindle gear, and a method for producing a gear spindle, with an improved transmission of axial forces that can arise in particular in the event of an accident.

EP 0 759 374 A2 has disclosed a device for the adjustment of a seat in a motor vehicle, which device can absorb forces considerably higher than those in normal operation, such as are generated for example in the event of a traffic accident. Here, it is important that the vehicle seat remains fixedly connected to the vehicle body in order to ensure the function of the protective measures provided for the vehicle occupants (safety belts, air bag). Here, a spindle nut that receives a threaded spindle is connected fixedly to the vehicle body. The threaded spindle is driven, via a worm wheel, by an electric motor, which in turn is fixedly connected to the seat. The gear housing of the worm wheel is manufactured from plastic and is connected via a further housing part to the drive motor. When the drive motor is actuated, the threaded spindle rotates and displaces the gear housing, including drive motor and seat, relative to the spindle nut. To prevent the gear housing from breaking away from the threaded spindle for example in the event of a collision, an additional metallic, U-shaped support part is provided which connects the gear housing, via a pivot pin, to the drive motor and thus to the seat. If the gear housing composed of plastic cannot withstand the high force flux, it is held, by means of an additional spindle nut, by the metallic support part.

A disadvantage of said embodiments is that, in addition to the complete gear housing, a cumbersome support structure is required, which increases the number of components and takes up additional structural space.

EP1223073 B1 presents a geared drive unit in which a worm wheel composed of plastic is arranged rotationally conjointly on a threaded spindle. Here, within the worm wheel, an annular support element is fastened to the threaded spindle, said support element being enclosed by the worm wheel. In the case of this embodiment, however, the external diameter of the worm wheel is enlarged, whereby the gear housing as a whole must be of correspondingly larger dimensions.

SUMMARY OF THE INVENTION

The gear spindle according to the invention, and the method for producing a gear spindle of said type, have the advantage that the crash resistance of the spindle gear is increased considerably through the formation of a recess region on the threaded spindle, into which recess region the material of the gearwheel engages. As a result of the formation of the recess region, there is formed, in addition to a first axial collar of the first retention region, a second axial collar of the second retention region, which second axial collar prevents the gearwheel manufactured from plastic from sliding off the threaded spindle. Owing to the plastics material that is used, the shear behavior between the gearwheel and the threaded spindle is different to that in the case of a purely metal-metal combination, because the plastic exhibits a certain flow behavior, or greater elastic deformability than metal. By contrast to the situation in the case of a purely metal-metal connection, the second collar of the second retention element created by the recess region yields an increase in strength of for example 1 to 3 kN (kilonewtons). As a result of the formation of said second mechanical barrier, a further shear shoulder is created, which absorbs additional tensile forces. Said additional shear shoulder is generated by the difference in external diameter of the second retention region in relation to the recess region. The spacing between the face surface of the radial bearing journal and the gear housing is advantageously selected such that, in the event of a crash, said face surface is supported on the gear housing, and thus the entire axial extent of the gearwheel serves as an effective shear length with the threaded spindle.

For example, the spindle gear can be a particularly compact construction if the gearwheel on the threaded spindle is in the form of a worm wheel whose worm toothing, arranged on the outer circumference, meshes with a corresponding drive worm, for example of an electric motor. By means of this worm toothing, it is also possible, if appropriate, to realize a desired self-locking action of the gear.

The two shear shoulders of the first and second retention regions can be produced in a particularly expedient manner in terms of manufacturing by virtue of the spindle thread, which extends over the entire length of the threaded spindle, being subjected to material removal—for example by turning—in each case in front of the first and second retention regions with respect to the spindle nut. Here, the diameter of said material-removed regions of the recess region and of the mounting region approximately corresponds to the base circle diameter of the spindle thread, whereby the mechanical stability of the threaded spindle is not impaired. The thread turns formed in the retention regions yield additional positive locking with the molded-on gearwheel, and this further increases the tensile strength. Through the removal of material of the spindle thread, it is not necessary for an additional retention element of relatively large external diameter to be molded on, whereby overall, the external diameter of the gearwheel is not enlarged.

In order for the spindle gear to be of compact construction, the gearwheel is arranged on an axial end of the gear spindle, which gear spindle is supported axially on a thrust element. To minimize friction, the threaded spindle bears against the thrust element by way of a domed surface. For this purpose, it is for example possible for a metal ball to be received on the axial end of the gearwheel—this being realized in particular by insert molding. In this way, the threaded spindle composed of metal is supported directly on the thrust element composed of metal, without plastics elements being situated in the force flux.

For the mounting of the gearwheel, there are integrally formed on the latter two bearing journals which are mounted directly in the housing main body of the gear housing. In this way, no additional radial bearing elements are required for the gearwheel. Owing to the larger external diameter of the external toothing, an additional collar is formed on the gearwheel between the bearing journal and the external toothing, which collar is for example supported on a support disk when axial tensile forces act on the threaded spindle.

In the region in which the gear spindle emerges from the housing wall of the gear housing, the gear housing has a further support element for retaining the gear spindle in the gear housing in the event of a crash. For this purpose, at least in the region around the threaded spindle, the housing wall is formed from metal, in particular in the form of a metallic housing part which is enclosed by a gear housing main body composed of plastic. For the mounting of the gear spindle, the latter has, in the region of the housing wall, a mounting region of reduced diameter, such that the internal diameter of the passage opening of the housing wall is smaller than the external diameter of the gearwheel, in particular than the bearing journals thereof. The internal diameter of the passage opening of the housing wall may preferably be smaller than the external diameter of the first retention region which is arranged within the gearwheel, such that there is a radial overlap between the retention region and the passage opening.

For the embodiment according to the invention for seat adjustment drives, the recess region extends in the axial direction over approximately 2-12 mm, wherein, corresponding to the illustration in FIG. 4, an axial extent of approximately 6-8 mm is preferred. Here, the axial edges of the recess region may be beveled, wherein the dimensions for the axial extent of the recess region relate to the region of fully reduced diameter.

The external diameter of the recess region preferably lies in a similar range to the core diameter of the spindle thread. In a variation of the invention, however, said diameter of the recess region may also be larger or smaller than the core diameter of the spindle thread, as long as it is smaller than the external diameter of the retention regions.

If material is removed from the thread in order to form the recess region, a maximum radial recess depth is realized without the mechanical stability of the threaded spindle being reduced as a result. The retention regions may be formed by the external diameter of the spindle gear or by a radial material protrusion formed in some other way. The tensile strength of the spindle gear is in this case increased considerably as a result of the formation of the encircling shear shoulders with a radial depth of 1-2 mm.

It is particularly expedient if, at the external diameter at least of the first retention region, radial positive locking with the gearwheel in the circumferential direction is generated, said positive locking serving for twist prevention. Said positive locking may be realized by way of a knurling or a radial depression, such that the plastics material of the gearwheel engages radially into the retention region. Here, the knurling is preferably pressed onto the external diameter of the spindle thread on the first and/or second retention region.

Owing to the design of the spindle gear according to the invention, it is possible, in the event of an accident, for higher crash forces to be absorbed without the gear spindle being torn out of the gear housing. Owing to the increase, according to the invention, of the strength with which the gearwheel is fastened to the threaded spindle, it is thereby possible, in combination with a support element on the housing wall of the gear housing—in particular in the region of the passage opening for the gear spindle—for the position of the seat, and of the passenger, to be held in a defined position. In this way, the optimum effect of the restraint systems (airbags, belt tensioners, pre-crash measures) is ensured.

For the absorption of high crash forces, it is particularly expedient for the gear housing composed of plastic to be enclosed by a more stable frame, such as can be realized for example by way of a metal bracket or metal cage. The spindle gear is driven in a particularly efficient manner by an electric motor. Here, it is for example possible for a worm to be arranged on an armature shaft, which worm drives the gearwheel which is in the form of a worm wheel. Alternatively, the gearwheel may also be driven via a flexible shaft that is connected to the electric motor.

In the method according to the invention for producing the gear spindle, it is advantageously the case that no additional components and also no additional material is required because, taking a continuous threaded rod as a starting point, certain regions of the thread are cut out. A mounting and recess region formed in this way, which is entirely or partially encapsulated by the gearwheel, considerably increases the crash resistance of the spindle gear.

BRIEF DESCRIPTION OF THE DRAWINGS

Preferred exemplary embodiments of the invention will be described in detail below with reference to the appended drawing. In the drawing.

DETAILED DESCRIPTION

Figure 1:
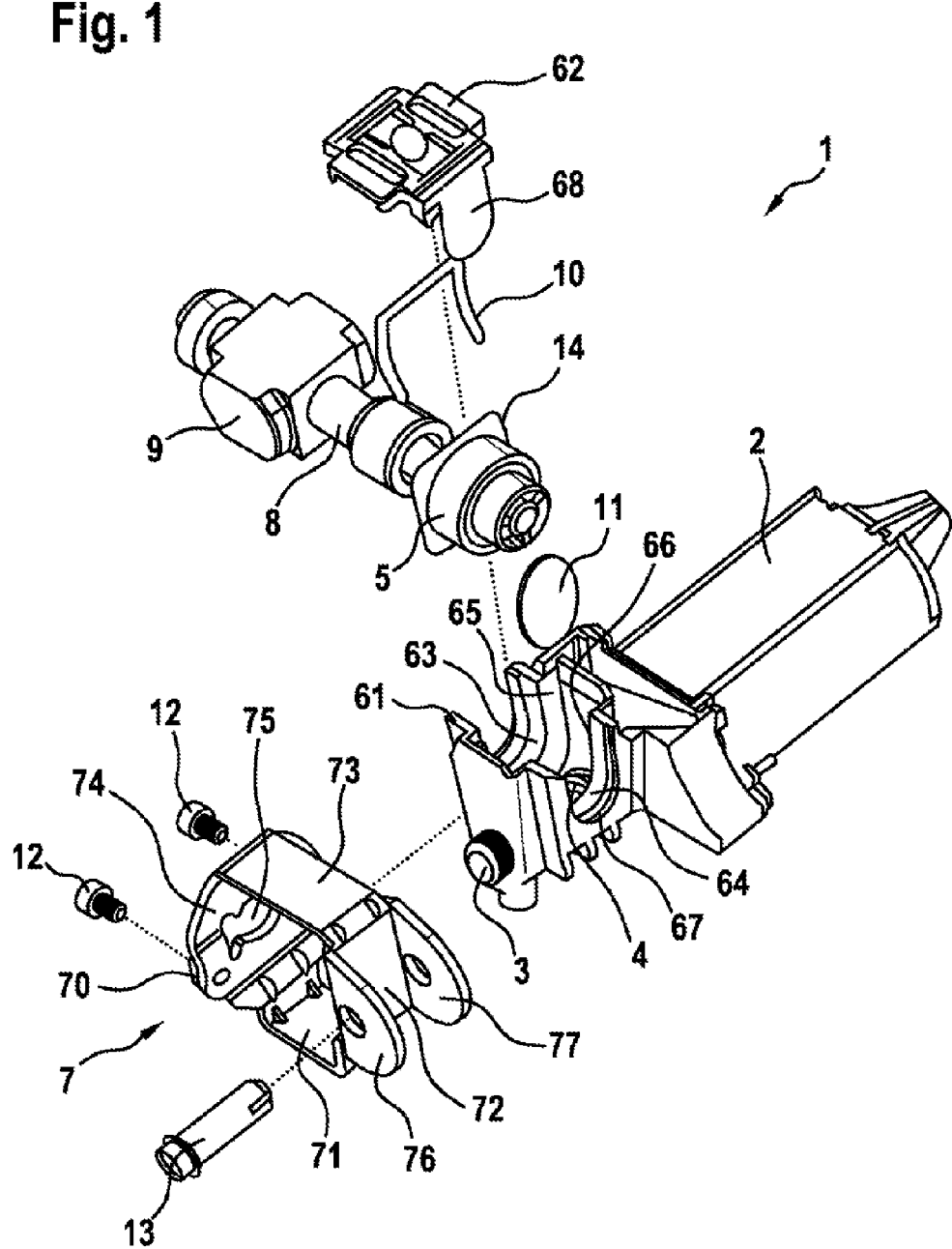
FIG. 1 is a perspective exploded illustration of a spindle gear according to an exemplary embodiment of the invention.

As can be seen in particular from FIG. 1, a geared drive unit 1 in the form of a spindle gear comprises a drive motor 2 with a drive output shaft 3 on which a worm 4 is provided. The geared drive unit 1 furthermore comprises a threaded spindle 8 which is arranged perpendicular to the drive output shaft 3. On the threaded spindle 8 there is arranged a gearwheel 5 in the form of a worm wheel which engages with the worm 4 of the drive output shaft 3. Also provided on the threaded spindle 8 is a spindle nut 9. The spindle nut 9 forms a first interface, for example to a vehicle seat.

The geared drive unit 1 also comprises a first housing part 6 composed of plastic and a second housing part 7 composed of metal, preferably aluminum or steel. The first housing part 6 in turn is of two-part form with a housing main body 61 and a housing cover 62. A clip-type connection may for example be provided between the housing main body 61 and the housing cover 62. The housing cover 62 furthermore comprises a tab 68 which is arranged at approximately a 90° angle with respect to the cover surface. The first and second housing parts 6, 7 form a gear housing 20 in which the worm 4 and the worm wheel 5 are accommodated.

All of the functional surfaces for the mounting of the threaded spindle 8 are provided on the first housing part 6. More precisely, a first radial bearing 63, a second radial bearing 64, a first axial bearing 65 and a second axial bearing 66 are provided on the first housing part 6. On the second housing part 7, which is produced from metal, there are provided further connection interfaces, for example to a vehicle body, in the form of a first flange 76 and a second flange 77. For this purpose, the two flanges 76, 77 each have a passage opening into which a spacer sleeve 13 is inserted. The second, metallic housing part 7 is of encircling, closed form and comprises a first side part 71, a second side part 72, a third side part 73 and a fourth side part 74. A passage opening 75 for the leadthrough of the threaded spindle 8 is provided in the fourth side part 74. Furthermore, an overlap 70 is provided on the fourth side part 74. Here, the second housing part 7 can be opened in the region of the overlap 70 and thus engaged over the threaded spindle 8. The overlap 70 is subsequently restored, and the two sub-regions of the second side part 74 are connected to one another, for example by means of two screws 12.

In the assembled state, at least a sub-region of the first housing part 6, which is produced from plastic, is surrounded by the second housing part 7. The second housing part 7 is in this case used in particular for the fixing of the geared drive unit 1 to, for example, a body or a seat part of a vehicle.

Furthermore, the geared drive unit 1 comprises a plate element 11 which is arranged, as viewed in the axial direction 16 of the threaded spindle 8, at a first end 81 of the threaded spindle 8. The plate element 11 is in this case situated parallel to the tab 68 of the housing cover 62, and abuts against said tab 68. The plate element 11 is in this case arranged in a groove 67 in the housing main body 61. Furthermore, a thrust disk 14 is provided which is arranged directly adjacent to the worm wheel 5 and against which the spring element 10 abuts.

It is thus possible according to the invention for interfaces of the geared drive unit 1 on the spindle nut 9 and the flanges 76, 77 to be separated from functional surfaces that are arranged exclusively on the first housing part 6. It is thus possible for the first housing part 6 to be molded from plastic, wherein the respective functional surfaces can also be directly molded conjointly without reworking of the functional surfaces being necessary. The force-absorbing interfaces on the second housing part 7 may in this case be formed from metal, such that, for example, forces in the event of an accident do not lead directly to destruction of the geared drive unit 1. The forces can in particular be transmitted onward via the flanges 76, 77 into a customer structure. If axial tensile or compressive forces 54 act on the threaded spindle 8, the threaded spindle 8 or the worm wheel 5 is always supported in the axial direction 16 on one of the axial bearings on the housing main body 61 or on the housing cover 62. Radial support is realized at the radial bearings 63, 64 of the housing main body 61. Since it is furthermore the case that interfaces of the geared drive unit 1 to external components are provided only on the spindle nut 9 and on the second housing part 7, it is the case for example in the automotive field that only variants of said two components need be stocked for different customers.

Figure 2:
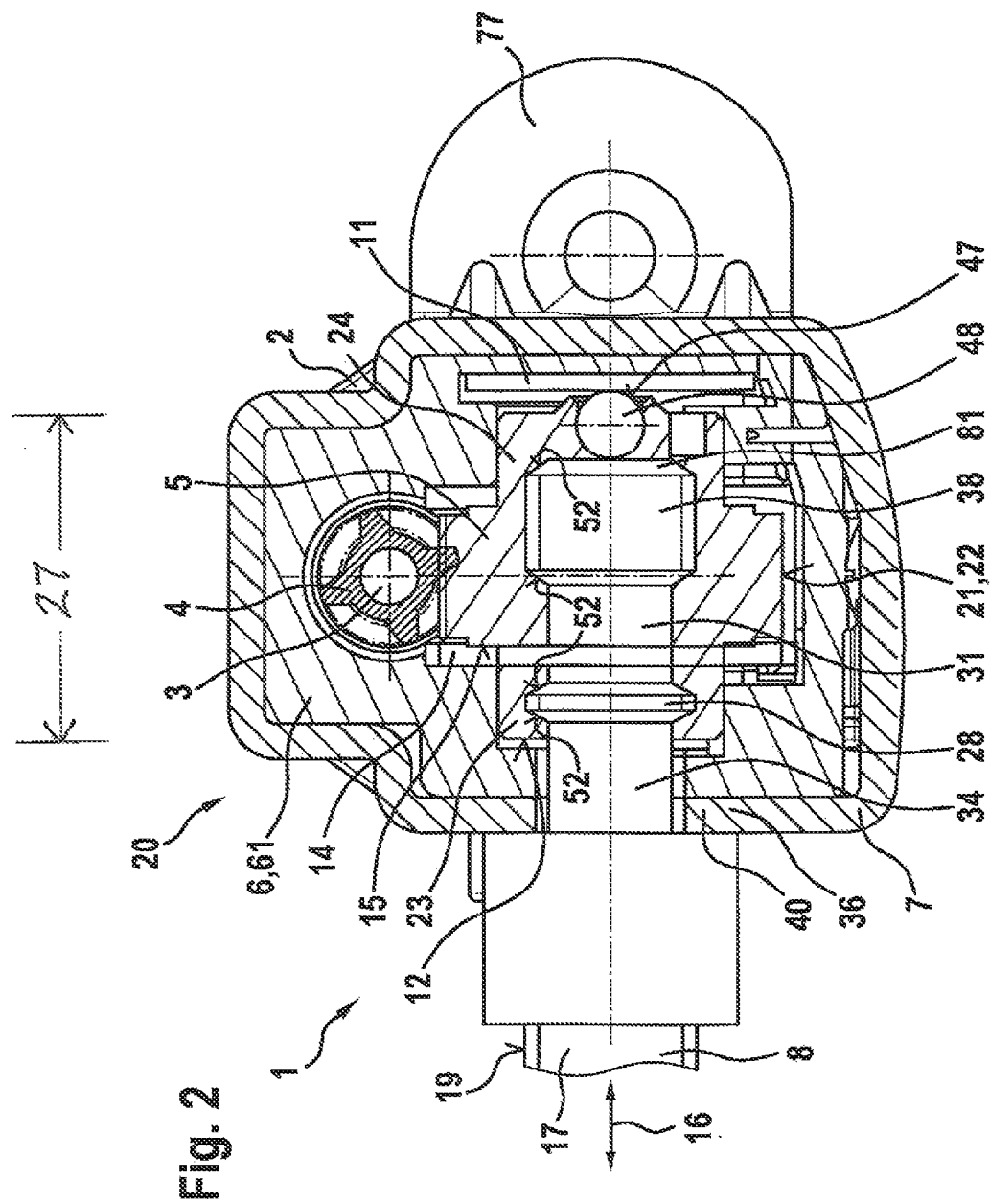
FIG. 2 shows a sectional view of a further embodiment of a spindle gear according to the invention.

FIG. 2 shows a section through a further geared drive unit 1, wherein the core of the threaded spindle 8 is not shown in section. The gearwheel 5 in the form of a worm wheel has an external toothing 21 in the form of a worm wheel toothing 22, and meshes with the toothing of the drive output shaft 3. In the exemplary embodiment, the drive output shaft 3 has a four-flight worm 4. Axially adjacent to the external toothing 21, the gearwheel 5 has a first bearing journal 23 facing the receiving region 17, said first bearing journal being mounted in the first radial bearing 63 of the housing main body 61. On the opposite side, there extends a second bearing journal 24 which is mounted correspondingly in the second radial bearing 64 of the housing main body 61. The gearwheel 5 is molded rotationally conjointly onto the threaded spindle 8. For this purpose, the threaded spindle 8 has, within an axial extent 27 of the gearwheel 5, a first retention region 28 whose external diameter 29 is larger than the diameter 30 of the adjoining recess region 31. Axially adjacent thereto, and facing away from the receiving region 17, there is arranged a second retention region 38 with an external diameter 39 which is likewise larger than the diameter 30 of the recess region 31. Thus, the recess region 31 of relatively small diameter 30 is arranged between the two retention regions 28, 38, with positive locking being generated between the recess region and the gearwheel 5 with respect to axial force action 54. Arranged between the first retention region 28 and the receiving region 17 there is a mounting region 34 with a diameter 34 smaller than the external diameter 29 of the first retention region 28. On the mounting region 34 there is arranged a housing wall 36 of the gear housing 20, said housing wall being formed, in particular as part of the second housing part 7, from metal. Said housing wall 36 encloses the threaded spindle 8 and forms an abutment 37 against which the gearwheel 5 is supported axially under the action of tensile load 54. The gearwheel 5 extends axially over the entire axial width 42 of the first retention region 28 and over the entire axial width 43 of the recess region 31, and in particular over the entire axial width 44 of the second retention region 38. In the exemplary embodiment, on that end 46 of the gear spindle 8 which is situated opposite the receiving region 17, there is arranged a spherical element 48 which bears by way of a domed surface 47 against the plate element 11 as abutment. The spherical element 48 is in this case enclosed radially by the gearwheel 5—preferably by the second bearing journal 24. For additional axial support, an annular thrust disk 14 is arranged between the external toothing 21 and the housing main body 61, against which thrust disk an axial collar 15 of the external toothing 15 abuts axially when the spindle is subjected to axial tensile load 54. On the outer circumference, the first retention region 28 and/or the second retention region 38 has a knurling 50 or radial formations 51 which prevent a rotation of the molded-on gearwheel 5 relative to the threaded spindle 8. In the exemplary embodiment, the retention regions 28, 38 are formed as part of the spindle thread 19, with the thread material having been retroactively removed in the recess region 31 and in the mounting region 34. The material removal may be performed for example by way of cutting processes, for example by turning. Here, a bevel 52 may be formed in each case on both axial sides of the first retention region 28 and/or of the second retention region 38.

Figure 3:
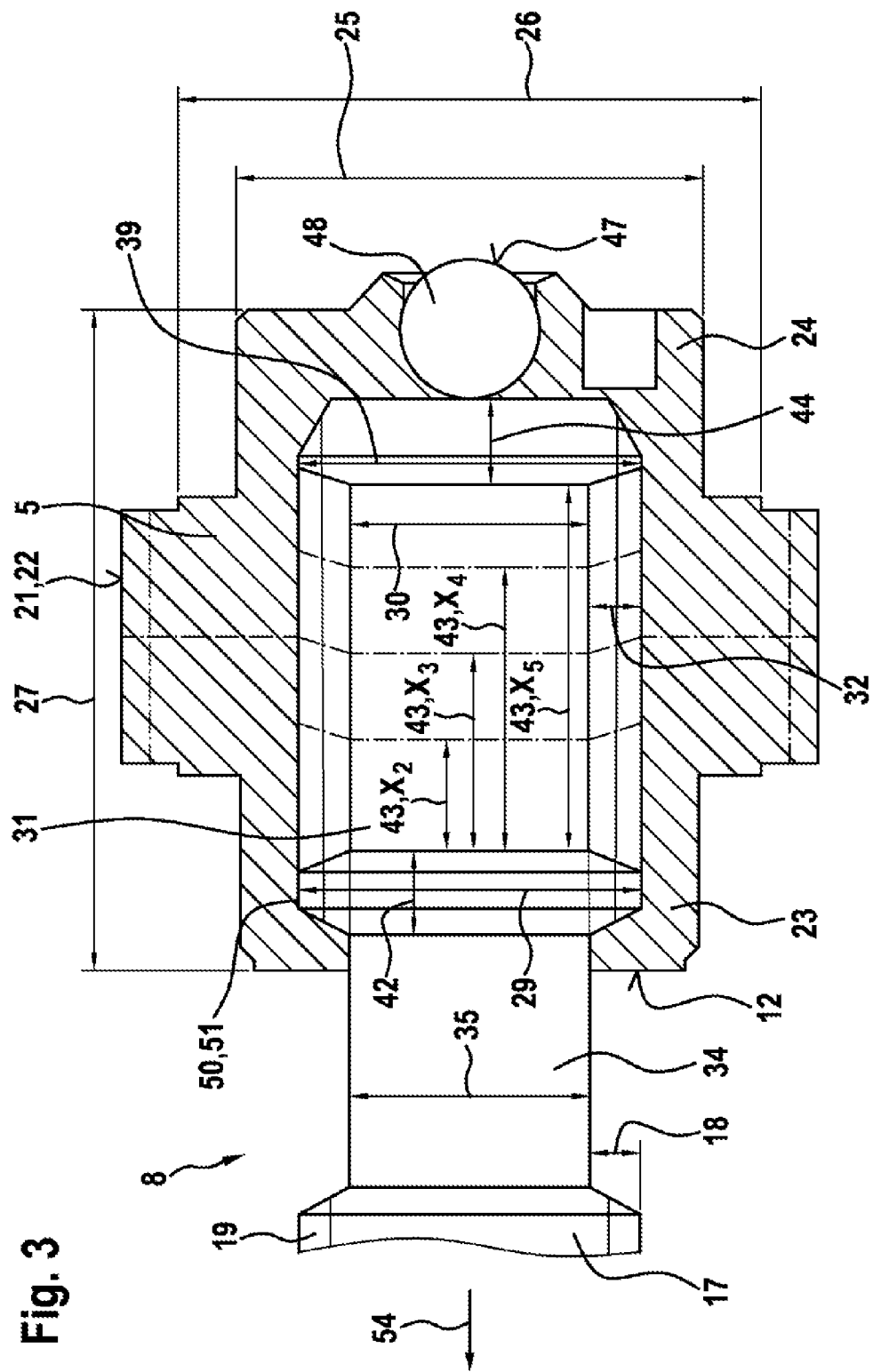
FIG. 3 shows a schematic sectional view of a threaded spindle with different embodiments of recess regions.

FIG. 3 illustrates, once again schematically, an embodiment of a threaded spindle 8. Here, different embodiments are shown, in which the axial width 43 of the recess region 31 is varied. For example, the axial width 43 of the recess region 31 is X2=4 mm in a first embodiment, X3=7 mm in a second embodiment, X4=10 mm in a third embodiment and X5=13 mm in a fourth embodiment. The axial width 43 of the recess region 31 is preferably always larger than the pitch of the spindle thread 19. The recess region 31 is in each case entirely encapsulated by the gearwheel 5, such that the plastics material of the gearwheel 5 within the recess region 31 varies correspondingly.

With regard to these different embodiments, tensile tests were carried out in each case, in which the threaded spindle 8 was pulled out of the gear housing 20 with a high axial force 54 until the gearwheel 5 broke off. In the process, the maximum tensile strength 60 of the gearwheel 5 was measured and plotted, in the diagram of FIG. 4, versus the axial width 43 of the recess region 31. In the upper curve 55 with the square measurement points 56, the first retention region 28 has a knurling 50 on the outer circumference in each case, and by contrast, in the case of the second, lower curve 57 with the rhomboidal measurement points 58, the retention regions 28, 38 have no knurling 50 and no radial formations 51. It can be seen that the two curves 55, 56 have a maximum in the case of an axial width 43 of the recess region 31 of approximately 7 mm. Therefore, the recess region 31 of the threaded spindle 8 according to the invention is preferably formed with an axial width 43 of approximately 7 mm, or in a range from 6-8 mm. Depending on the dimensions of the threaded spindle 8 and of the gearwheel 5, it is also possible for the recess region 31 to select axial widths 43 that lie in the range from 5-9 mm or even in a range from 2-12 mm. In a typical embodiment, the recess region 31 has in this case for example a diameter 30 of 8-10 mm, wherein the external diameters 29 and 39 of the first and second retention regions 28, 38 are approximately 11-13 mm. That is to say, the tooth height 18 of the thread flights of the spindle thread 19 is approximately 1-2 mm. The external diameters 29, 39 of the two bearing journals 23, 24 typically lie in the range of 14-18 mm, and the external toothing 21 has for example a base circle diameter 26 in the range from 18-22 mm. For reasons relating to structural space, the gearwheel 5 has a maximum axial extent 27 of for example 20-30 mm, in particular approximately 25 mm. The gearwheel 5 is preferably manufactured from POM plastic, which is for example molded onto a threaded spindle 8 composed of metal.

Figure 4:
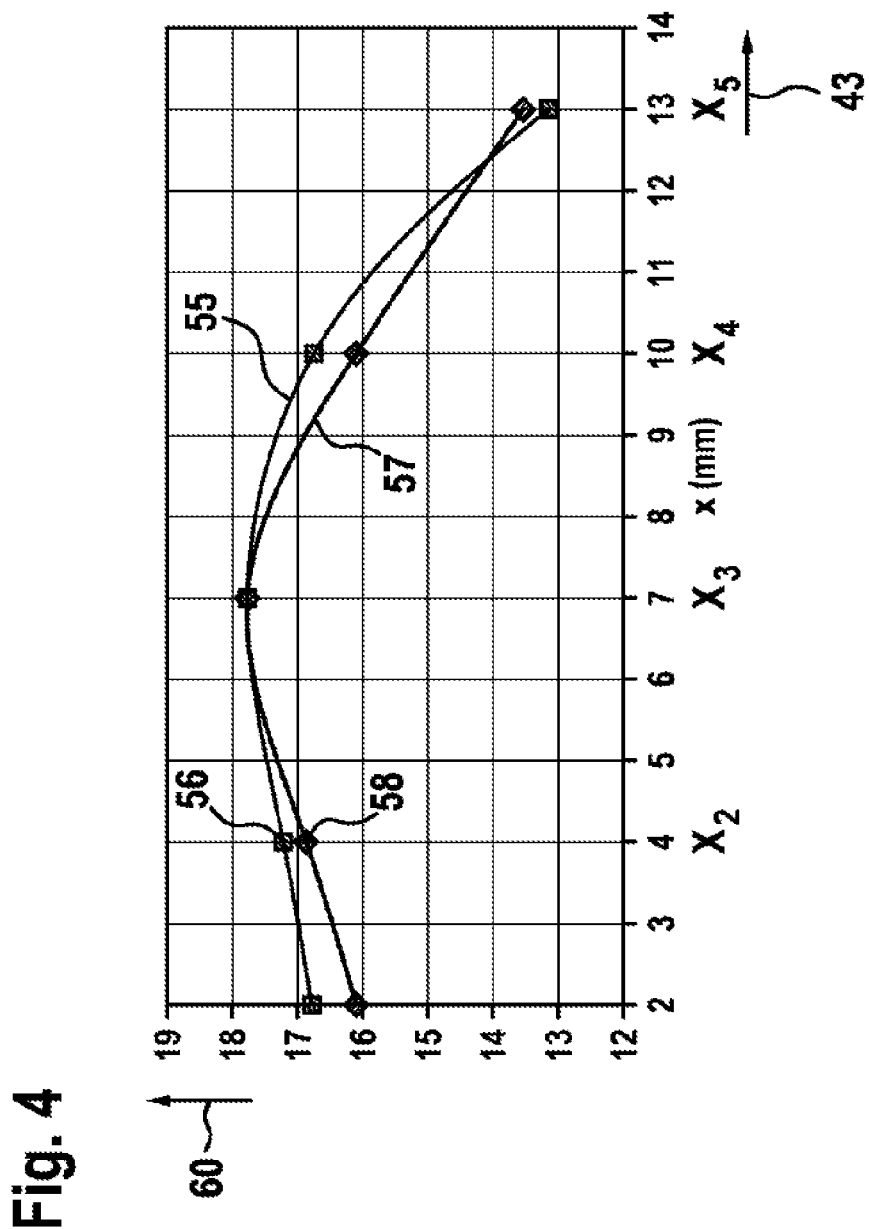
FIG. 4 is a graphic illustration of the spindle strength as a function of the recess length.

From the diagram of FIG. 4, it can be seen that forming a knurling 50 or a radial formation 51 on the outer circumference of the first or second retention region 28, 38 not only effects rotational locking between the gearwheel 5 and the threaded spindle 8 but also, at least in the range of the optimum axial width 43 of the recess region 31, increases the maximum tensile strength of the threaded spindle 8 in the gear housing 20.

The exemplary embodiments explain the invention on the basis of a seat adjustment device, but the invention may also be used for other adjustment movements, for example as a steering assistance drive, in which the drive output shaft 3 should be prevented from becoming detached from the gear housing 19 under the action of high forces. A combination of the individual features of the different exemplary embodiments also realizes a threaded spindle 9 and geared drive unit 1 according to the invention.

The invention claimed is:

1. A gear spindle (8), having a spindle thread (19) for receiving a spindle nut (9), wherein a gearwheel (5) composed of plastic which is molded rotationally and conjointly on the gear spindle (8), wherein the gearwheel has an external toothing (21) that is engageable to cause rotation of the gearwheel (5) and the gear spindle (8), wherein the gearwheel (5) has an axial extent (27), wherein the gear spindle (8) has two retention regions (28, 38) that have an external diameter larger than an external diameter of a recess region (31), wherein the entire recess region (31) is located between the retention regions (28, 38) and is located within the axial extent (27) of the gearwheel, and wherein the external diameter of the two retention regions (28, 38) is formed by an outer circumference of the spindle thread (19), and the recess region (31) is formed by removal of material of the spindle thread (19).

2. The gear spindle (8) as claimed in claim 1, wherein the gearwheel (5) is in the form of a worm wheel (5) which has an external worm toothing (21, 22) and which can be driven by means of a worm (4).

3. The gear spindle (8) as claimed in claim 1, wherein the gearwheel (5) is arranged on an axial end (81) of the gear spindle (8), and the gearwheel (5) at least partially encloses a spherical element (48) which is formed as an axial abutment (11) of the gear spindle (8).

4. The gear spindle (8) as claimed in claim 1, wherein the gearwheel (5) has, axially on both sides of the external toothing (21), in each case axially extending radial bearing journals (23, 24).

5. The gear spindle (8) as claimed in claim 1, wherein, between a receiving region (17) of the spindle nut (9) and one of the retention regions (28), which faces toward said receiving region (17), there is arranged a mounting region (34) that has an external diameter (35) smaller than an external diameter of the retention regions (28, 38).

6. The gear spindle (8) as claimed in claim 1, wherein the recess region (31) has an axial extent (43) in a range from 2-12 mm.

7. The gear spindle (8) as claimed in claim 1, wherein the recess region (31) has an external diameter (30) of 8-10 mm and the retention regions (28, 38) have an external diameter of 11-13 mm.

8. The gear spindle (8) as claimed in claim 1, wherein a difference between the external diameters of the recess region (31) and of the retention regions is 2-4 mm.

9. The gear spindle (8) as claimed in claim 1, wherein, at least on the external diameter of one of the retention regions (28, 38), there is formed a knurling (50) or other radial formations (51) for forming a twist prevention means for the gearwheel (5).

10. A spindle gear (1) having the gear spindle (8) as claimed in claim 1, wherein the gearwheel (5) is mounted within a gear housing (61, 20), and the receiving region (17) of the threaded spindle (8) projects out of the gear housing (20), and the gear spindle (8) is at least partially enclosed by a support element (40), wherein, under action of an external axial force (54), the gearwheel (5) is supported by way of an axial face side (12) against the support element (40).

11. A spindle gear (1) having the gear spindle (8) as claimed in claim 4, wherein the radial bearing journals (23, 24) of the gearwheel (5) are mounted within a housing main body (61) which is composed of plastic and which is enclosed by a metal bracket (71, 72, 73, 74) of the gear housing (20).

12. A method for producing a gear spindle (8) as claimed in claim 1, comprising the following steps:
firstly, the spindle thread (19) is formed on the gear spindle (8),
subsequently, the spindle thread (19) is subjected to material removal in the recess region (31), and
subsequently, at the recess region (31) and at adjacent retention regions (28, 38), a gearwheel (5) is molded, from plastic, around the threaded spindle (8).

13. The gear spindle (8) as claimed in claim 1, wherein the gearwheel (5) has, axially on both sides of the external toothing (21), in each case axially extending radial bearing journals (23, 24) whose diameter (25) is smaller than a base circle diameter (26) of the external toothing (21).

14. The gear spindle (8) as claimed in claim 1, wherein, partially within the axial extent (27) of the gearwheel (5), there is arranged a mounting region (34) with the same external diameter (30) as the recess region (31).

15. The gear spindle (8) as claimed in claim 1, wherein the recess region (31) has an axial extent (43) in the range from 5-9 mm.

16. The gear spindle (8) as claimed in claim 1, wherein the recess region (31) has an axial extent (43) in the range from 6-8 mm.

17. The gear spindle (8) as claimed in claim 1, wherein the recess region (31) has an external diameter (30) of 8-10 mm and the retention regions (28, 38) have an external diameter of 11-13 mm, and the axial length (27) of the gearwheel (5) is between 20-30 mm.

18. The gear spindle (8) as claimed in claim 1, wherein the recess region (31) has an external diameter (30) of 8-10 mm and the retention regions (28, 38) have an external diameter of 11-13 mm, and the axial length (27) of the gearwheel (5) is approximately 25 mm.

19. The gear spindle (8) as claimed in claim 1, wherein the difference between the external diameters of the recess region (31) and of the retention regions is approximately 3 mm, wherein said difference corresponds to twice the tooth height (18) of the spindle gear (19).

20. A spindle gear (1) having a gear spindle (8) as claimed in claim 1, wherein the gearwheel (5) is mounted within a gear housing (61, 20), and the receiving region (17) of the threaded spindle (8) projects out of the gear housing (20), and the gear spindle (8) is at least partially enclosed by a support element (40), wherein, under action of an external axial force (54), the gearwheel (5) is supported by way of an axial face side (12) against the support element (40), and the support element (40) is formed as part of a gear housing wall (36) which is arranged on the mounting region (34) of the threaded spindle (8).

21. A spindle gear (1) having the gear spindle (8) as claimed in claim 4, wherein the radial bearing journals (23, 24) of the gearwheel (5) are mounted within a housing main body (61) which is composed of plastic and which is enclosed by a metal bracket (71, 72, 73, 74) of the gear housing (20), and the spindle gear (1) has an electric motor (2) which drives the gearwheel (5).

\* \* \* \* \*